Feb. 2, 1960   G. A. DARKENWALD   2,923,450
CARRYING CASE FOR FISH LANDING NET
Filed Dec. 2, 1957
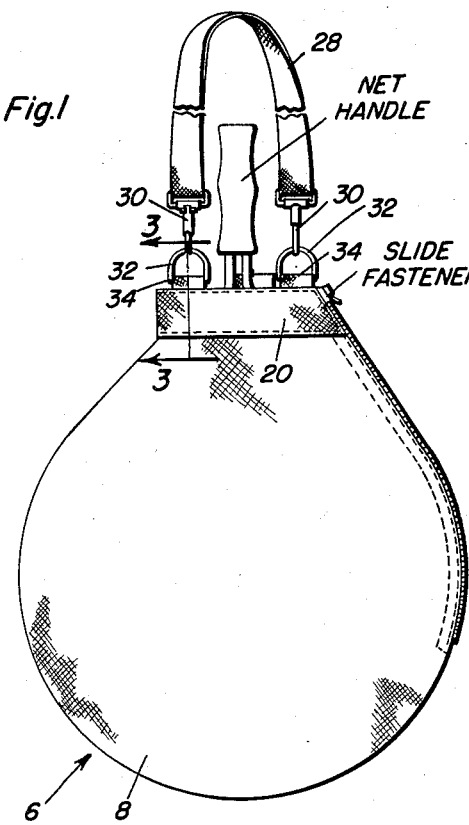
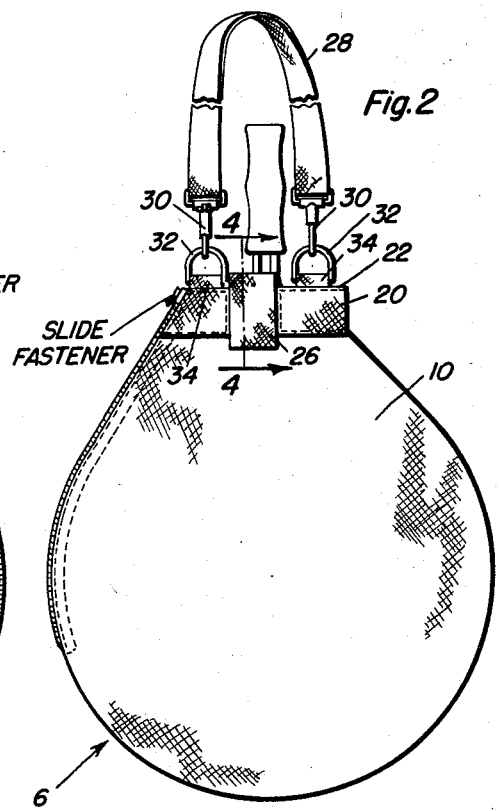
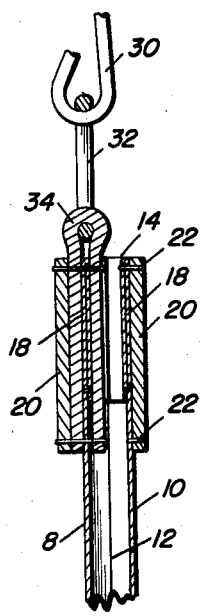
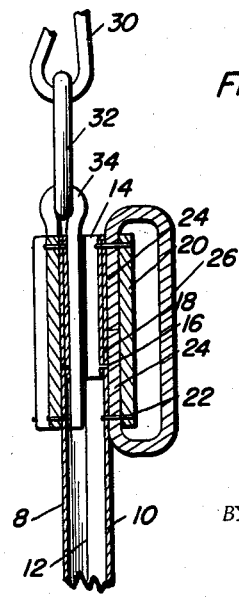
George A. Darkenwald
INVENTOR.

2,923,450
CARRYING CASE FOR FISH LANDING NET

George A. Darkenwald, Billings, Mont.

Application December 2, 1957, Serial No. 700,012

1 Claim. (Cl. 224—5)

The present invention relates to a novel and practical fisherman's carrying case for a landing net of a type having a supporting frame equipped with a handle and with the net attached to and operable by the frame.

Although it is common practice to provide a fish landing net with a suitable carrying strap, the net portion is subject to injury as it dangles while being carried alongside of a fisherman. Time and again a fisherman will get his net caught on thorny bushes, the twigs and limbs on dead trees, rough tree stumps, barbed wire on fences and so on. Manifestly this state of affairs hinders the fisherman in his movements. Not only this, many fishermen do not carry nets because they have come to be such a nuisance because, as above stated, they are time and again getting caught. Many a net has been jerked loose when caught on something and a hole torn in the net, rendering it useless until satisfactorily repaired.

Because of the above and similar difficulties and problems posed thereby a practical solution appears to be the provision of a simple, economical and easy-to-use canvas or an equivalent case.

Briefly, a canvas or an equivalent bag serves as a suitable case. This is provided with a restricted opening or mouth at one end and has one marginal side portion which is openable and closable by way of a suitably mounted and operating slide fastener of the so-called zipper type.

The invention features a construction which is provided at the mouth or top opening with a belt loop which provides one way of conveniently attaching the case to the person of the fisherman. In addition a shoulder strap is provided and is detachably connected to the bag by snap fasteners, said shoulder strap serving as an optional means of attaching the case to the fisherman.

Other objects, features and advantages will become more readily apparent from the following description and the accompanying drawing.

In the drawing, wherein like numerals are employed to designate like parts throughout the same:

Fig. 1 is a front elevation of a carrying case in which a handle-equipped fishing net is protectively encased for protected handling.

Fig. 2 is a similar view in elevation looking at the opposite side of the case.

Fig. 3 is a detail section on an enlarged scale on the line 3—3 of Fig. 1, and

Fig. 4 is a fragmentary sectional view on the vertical line 4—4 of Fig. 2.

Referring now to the drawing the case takes the form of a bag 6 which is of a size to satisfactorily enclose the net and frame portion of a fish landing net (not detailed). Because it is waterproof, tough and ideal for the purposes the bag is made up of two half sections or components each of general ovate form in plan and these sections are denoted by the numerals 8 and 10 and have their marginal edge portions 12 turned in and stitched or otherwise connected together. The smaller end of the bag is left open as seen in Figs. 3 and 4. Also the canvas portions are turned or bent in on themselves as at 14 and stitched in place at 16 to provide a double-ply mouth or open end 18. A tough length of strap encircles the mouth exteriorly and provides a reinforcing element 20 suitably stitched in place at 22. On one side the end portions of a short piece of strap material are turned in toward each other as at 24 and the main strap portion is thus formed into what is here designated as a belt loop 26. This permits the case to be attached to one's trousers belt.

Where the fisherman is not accustomed to wearing a trousers belt he may prefer to carry the case by way of a stretchless shoulder strap 28. The strap is provided at its end portions with suitable snap fasteners 30 releasably connected to metal links or rings 32 which are in turn secured to the mouth portion of the case or bag by way of suitably looped straps 34. Here again the end portions of the looped straps 34 are fastened in conjunction with the doubled portions 18 of the canvas and the encircling mouth reinforcing strap 20 as brought out for example in Fig. 3.

As is evident the case revealed is satisfactorily used to enclose and carry, with requisite nicety, a fish landing net. Although it is described as made of canvas, commercial plastics of suitable grade may be substituted. Also instead of having a slide fastener or zipper connecting the edge portions in closing the openable part of the case for insertion and removal of the net, other fastening means such as a lacing, or buttons and buttonholes (not shown) may be employed. With this construction and with the net in position the opening at the top allows the handle to extend out for ease of removing the net from the case when ready to land a fish. With the case strapped on the shoulder or attached to the belt its practical usefulness is insured. Where one desires to attach the case to the belt the snap fasteners may be opened and the shoulder strap 28 completely detached.

Minor changes in shape, size, materials, and rearrangement of cooperating components may be resorted to in actual practice without departing from the spirit of the invention or the scope of the invention as claimed.

What is claimed as new is as follows:

A fish landing net carrier comprising a flat, generally ovate, flexible case for the reception of the net and substantially conforming to the shape thereof, said case comprising an inwardly and reversely folded small upper end portion defining a flat, elongated mouth for accommodating the handle of the net, said case further having an opening in one edge portion thereof communicating with the mouth for facilitating the insertion and removal of the net, means for closing the opening, upstanding loops mounted astraddle the opposite sides of the mouth adjacent the ends thereof, a shoulder strap detachably connected at its ends to said upstanding loops, a belt loop mounted on one side of the mouth at an intermediate point, and a strap extending substantially around the mouth, said strap extending across the outer end portions of the upstanding loops and through the belt loop and being stitched to all of said loops and to the mouth.

References Cited in the file of this patent

UNITED STATES PATENTS

| 1,208,728 | Bartlett et al. | Dec. 19, 1916 |
| 1,413,290 | O'Leary | Apr. 18, 1922 |
| 1,643,189 | Urovksy | Sept. 20, 1927 |
| 2,167,587 | Rowe | July 25, 1939 |
| 2,654,514 | Jensen | Oct. 6, 1953 |
| 2,869,277 | Breithaupt | Jan. 20, 1959 |

FOREIGN PATENTS

| 426,542 | Great Britain | Apr. 4, 1935 |
| 153,855 | Austria | July 25, 1938 |